US012683985B2

(12) United States Patent
Kim et al.

(10) Patent No.: US 12,683,985 B2
(45) Date of Patent: Jul. 14, 2026

(54) METHOD OF DETECTING SEQUENCE-BASED INTRUSION BY USING DBC FILE

(71) Applicant: KOREA UNIVERSITY RESEARCH AND BUSINESS FOUNDATION, Seoul (KR)

(72) Inventors: Huy Kang Kim, Seoul (KR); Hwejae Lee, Seoul (KR); Sangho Lee, Seoul (KR); Yeon Jae Kang, Namyangju-si (KR); Daekwon Pi, Goyang-si (KR); Jae Woong Choi, Seoul (KR); Huiju Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 188 days.

(21) Appl. No.: 18/223,884

(22) Filed: Jul. 19, 2023

(65) Prior Publication Data

US 2024/0039931 A1      Feb. 1, 2024

(30) Foreign Application Priority Data

Jul. 27, 2022     (KR) ........................ 10-2022-0093333

(51) Int. Cl.
*H04L 9/40*              (2022.01)
(52) U.S. Cl.
CPC ...... *H04L 63/1416* (2013.01); *H04L 63/1425* (2013.01)
(58) Field of Classification Search
CPC ........................ H04L 63/1416; H04L 63/1425
(Continued)

(56) References Cited

U.S. PATENT DOCUMENTS 11,973,769  B1 *   4/2024   Le ........................ H04L 63/1425
2019/0238586  A1    8/2019   Hong et al.
(Continued)

FOREIGN PATENT DOCUMENTS

KR            10-1754951 B1     7/2017
KR      10-2018-0105850 A      10/2018
(Continued)

OTHER PUBLICATIONS

Aiguo Zhou, Anomaly Detection of CAN Bus Messages Using a Deep Neural Network for Autonomous Vehicles, Aug. 4, 2019, School of Mechanical Engineering, Tongji University, Shanghai (Year: 2019).*

(Continued)

*Primary Examiner* — Lynn D Feild
*Assistant Examiner* — Saad Ahmad Abdullah
(74) *Attorney, Agent, or Firm* — NSIP Law

(57)              ABSTRACT

[SUMMARY]
A method of detecting a sequence-based intrusion by using a Database CAN (DBC) file, the method being performed by a computing device including a processor according to some exemplary embodiments of the present disclosure, includes: obtaining a first Controller Area Network (CAN) message generated from a CAN; determining the first CAN message as a first category among a plurality of categories based on a pre-stored DBC file; obtaining first predictive data from the first CAN message by using a pre-trained first neural network model, the pre-trained first neural network model corresponding to the first category and including a first hidden layer; and comparing the first predictive data and first actual data obtained based on the first CAN message to determine whether the first CAN message has an anomaly.

9 Claims, 9 Drawing Sheets

(58) Field of Classification Search
USPC ........................................................... 726/23
See application file for complete search history.

(56) References Cited

U.S. PATENT DOCUMENTS

| | | | |
|---|---|---|---|
| 2020/0183373 A1 | 6/2020 | Choi et al. | |
| 2022/0164248 A1* | 5/2022 | Stein ...................... | G06N 3/045 |
| 2022/0407880 A1* | 12/2022 | Rosadini ................. | H04L 12/12 |

FOREIGN PATENT DOCUMENTS

| | | | | |
|---|---|---|---|---|
| KR | 10-2020-0069852 A | 6/2020 | | |
| KR | 10-2020-0098904 A | 8/2020 | | |
| KR | 10-2021-0043053 A | 4/2021 | | |
| KR | 10-2021-0086546 A | 7/2021 | | |
| KR | 10-2274389 B1 | 7/2021 | | |
| KR | 10-2022-0046408 A | 4/2022 | | |
| WO | WO-2019053234 A1 * | 3/2019 | ............. | G06N 3/044 |

OTHER PUBLICATIONS

Aiguo Zhou, "Anomaly Detection of CAN Bus Messages Using a Deep Neural Network for Autonomous Vehicles", Aug. 4, 2019 (Year: 2019).*
Linxi Zhang "A Hybrid Approach Toward Efficient and Accurate Intrusion Detection for In-Vehicle Networks", Jan. 1, 2022.*

* cited by examiner

[FIG. 1]
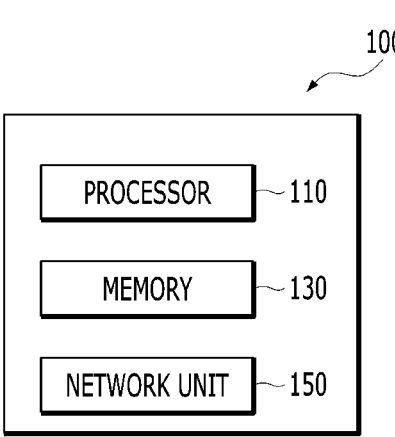

[FIG. 2]
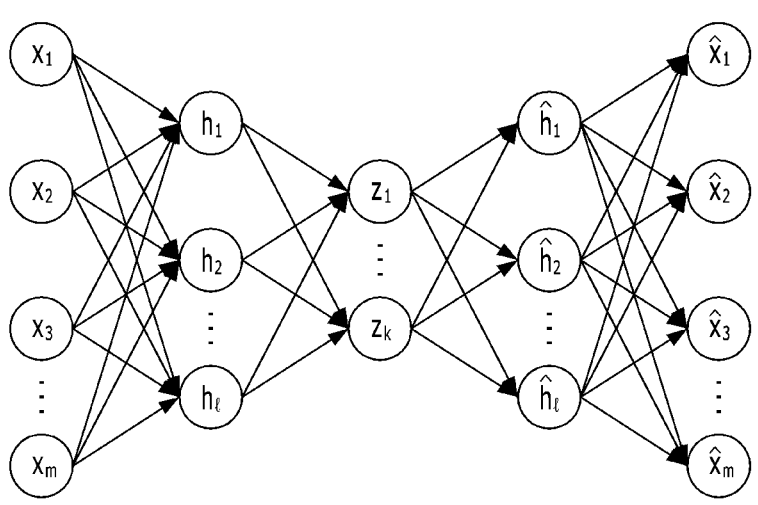

[FIG. 3]
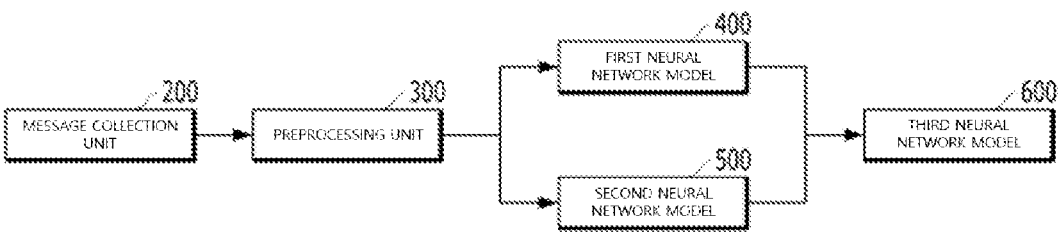

[FIG. 4]
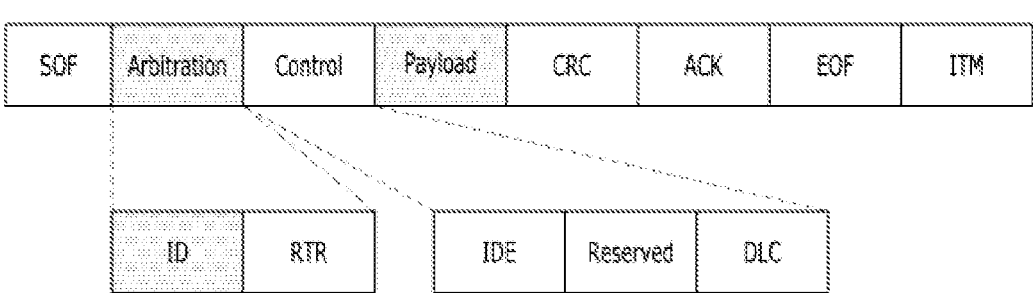

[FIG. 5]

| CAN ID |
|--------|

| Signal name | Start bit | Bit length | Increment | Range | Affecting function |
|-------------|-----------|------------|-----------|-------|--------------------|

⋮

| Signal name | Start bit | Bit length | Increment | Range | Affecting function |
|-------------|-----------|------------|-----------|-------|--------------------|

[FIG. 6]
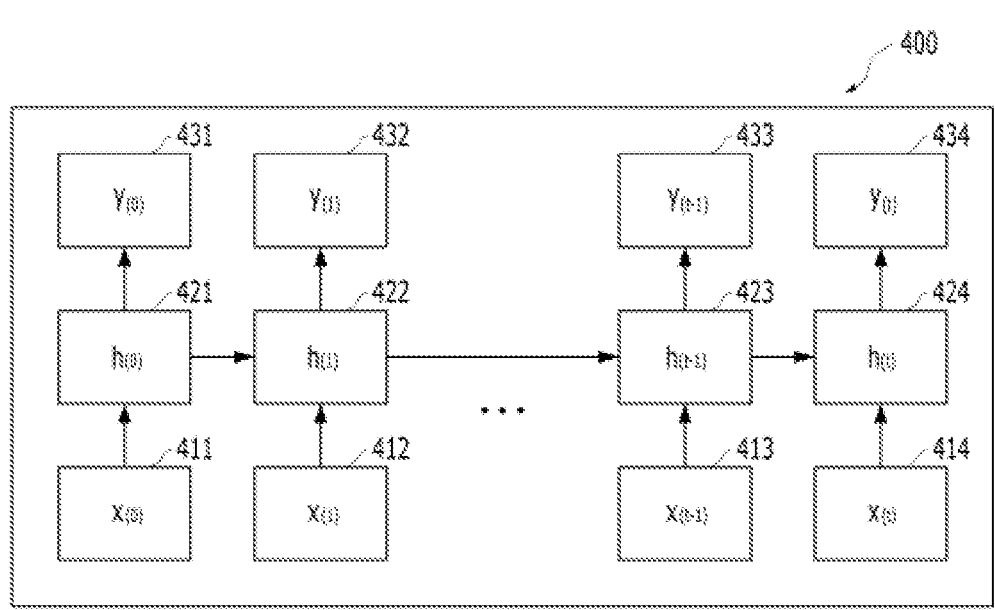

[FIG. 7]
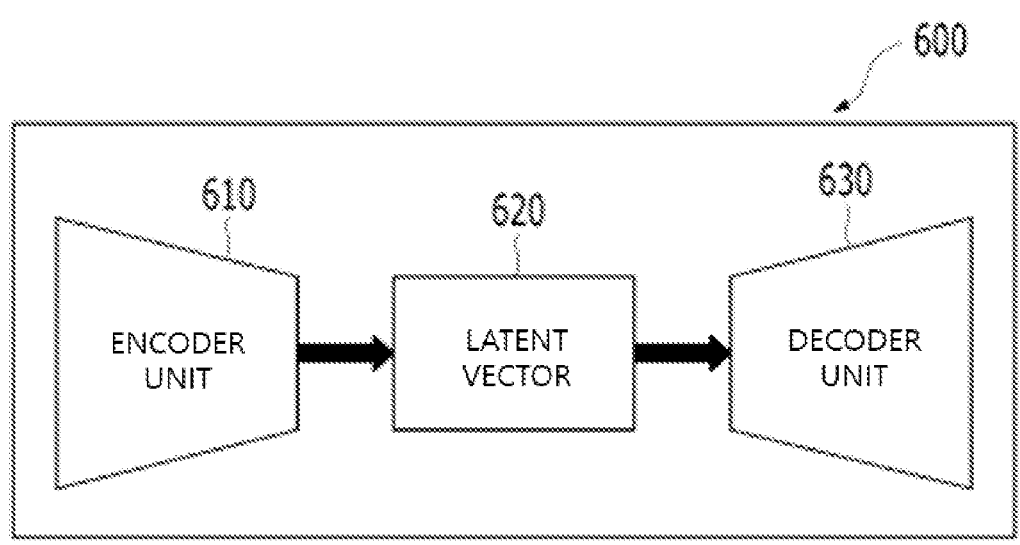

[FIG. 8]
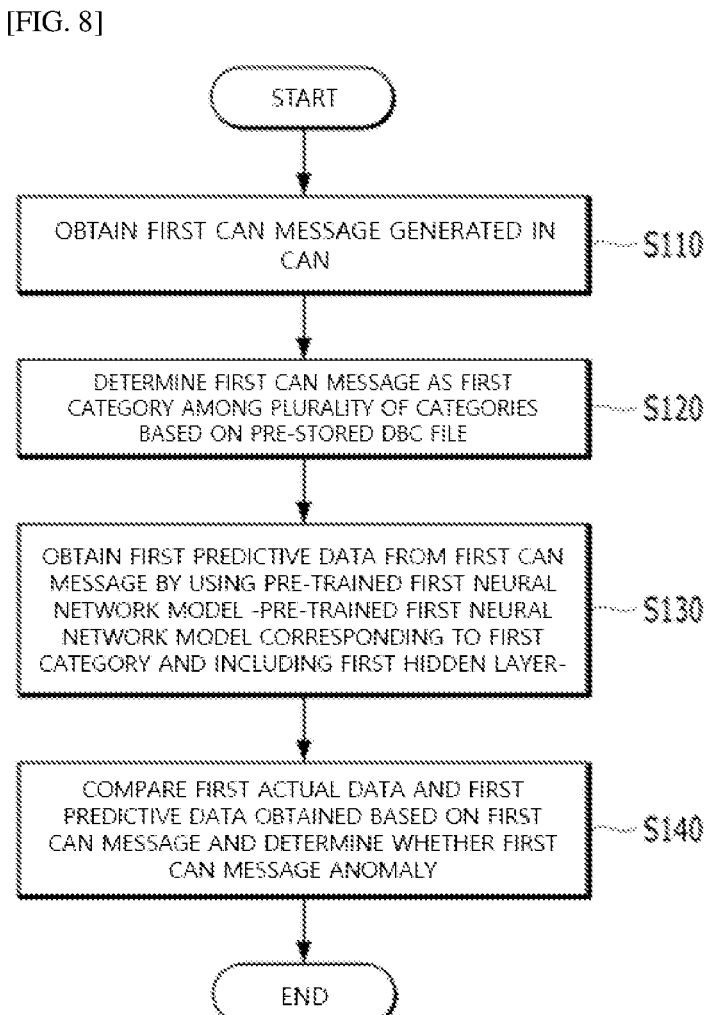

[FIG. 9]
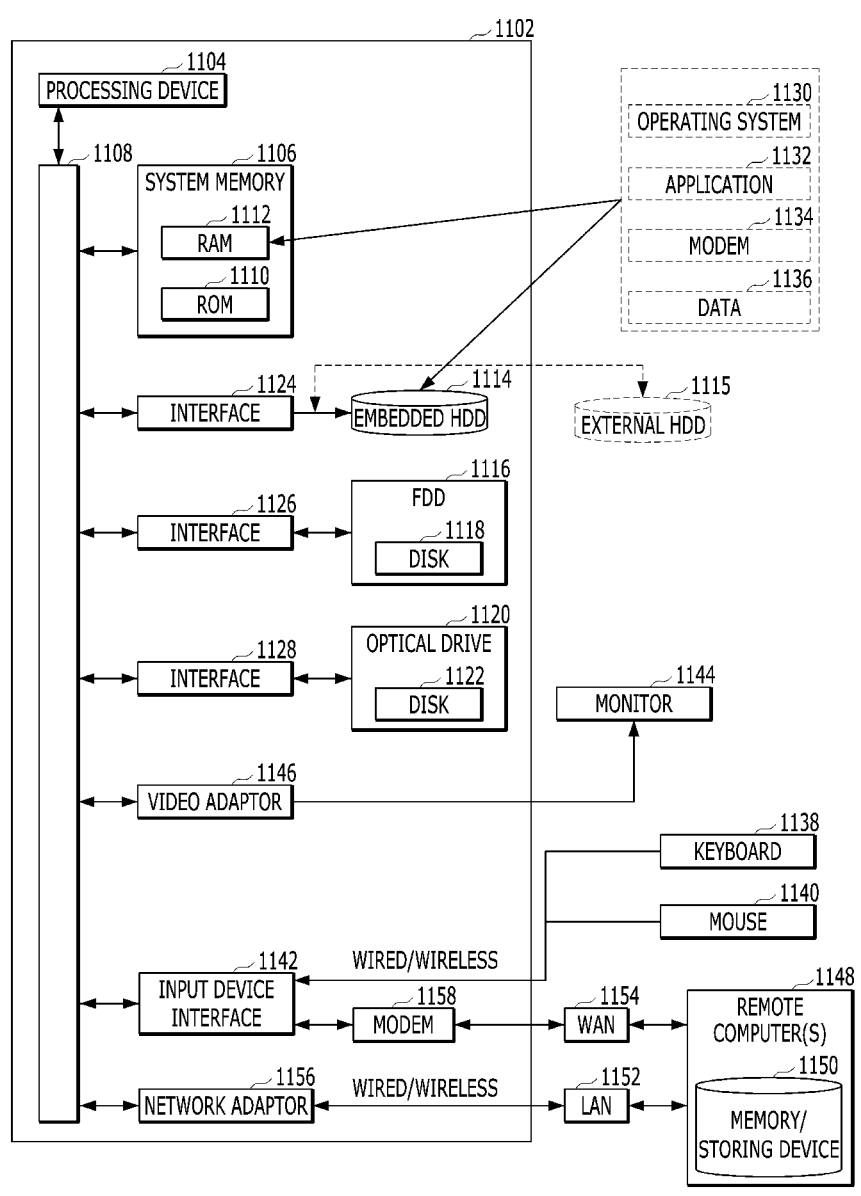

METHOD OF DETECTING SEQUENCE-BASED INTRUSION BY USING DBC FILE

CROSS-REFERENCE TO RELATED APPLICATIONS

This application claims priority to and the benefit of Korean Patent Application No. 10-2022-0093333 filed in the Korean Intellectual Property Office on Jul. 27, 2022, the entire contents of which are incorporated herein by reference.

TECHNICAL FIELD

The present disclosure relates to a method of detecting an intrusion, and more particularly, to a method of detecting a sequence-based intrusion by using a DBC file.

BACKGROUND ART

A Controller Area Network (CAN) is a communication standard developed in 1983 and is currently used for most internal vehicle communications, and is also used for internal communications in various Cyber Physical Systems (CPSs) based on its reliability and low cost.

In the past, CAN systems in vehicles were closed systems that were not connected to the outside, so security was not considered in the protocol design. Recently, vehicles are connected with the outside through new environments, such as Vehicle-To-Vehicle (V2V) and Vehicle-To-Everything (V2X), and security issues have arisen.

The existing machine learning-based anomaly detection techniques create machine learning models that use all data at once, without considering specific functional parts. Therefore, existing machine learning-based anomaly detection techniques are difficult to detect specific functional parts and difficult to learn similarities between functional parts.

RELATED ART DOCUMENT

Patent Document (Patent Document 1) Korean Patent No. 10-1754951 (Jun. 30, 2017)

DISCLOSURE OF THE INVENTION

The Objects to Solve

The present disclosure is conceived to in response to the foregoing background art, and is to provide a method of detecting a sequence-based intrusion by using a DBC file.

The technical objects of the present disclosure are not limited to the foregoing technical objects, and other non-mentioned technical objects will be clearly understood by those skilled in the art from the description below.

Means to Solve the Objects

An exemplary embodiment of the present disclosure for implementing the foregoing technical object discloses a method of detecting a sequence-based intrusion by using a Database CAN (DBC) file, the method being performed by a computing device including a processor, the method including: obtaining a first Controller Area Network (CAN) message generated from a CAN; determining the first CAN message as a first category among a plurality of categories based on a pre-stored DBC file; obtaining first predictive data from the first CAN message by using a pre-trained first neural network model, the pre-trained first neural network model corresponding to the first category and including a first hidden layer; and comparing the first predictive data and first actual data obtained based on the first CAN message to determine whether the first CAN message has an anomaly.

Alternatively, the method may further include: obtaining a second CAN message generated in the CAN; determining the second CAN message as a second category among the plurality of categories based on the pre-stored DBC file; obtaining second predictive data from the second CAN message by using a pre-trained second neural network model, the pre-trained second neural network model corresponding to the second category and including a second hidden layer corresponding to the first hidden layer; and comparing the second predictive data and second actual data obtained based on the second CAN message to determine whether the second CAN message has an anomaly.

Alternatively, the comparing the first actual data and the first predictive data obtained based on the first CAN message to determine whether the first CAN message has the anomaly may include: calculating a first loss value of the pre-trained first neural network model based on a difference between the first actual data and the first predictive data; and comparing the first loss value with a preset first threshold value to determine whether the first CAN message has an anomaly.

Alternatively, the method may further include: generating a first concatenation value obtained by concatenating a value of a first hidden state obtained from the first hidden layer and a value of a second hidden state obtained from the second hidden layer; obtaining a first output value from the first concatenation value by using a pre-trained third neural network model; and comparing the first concatenation value and the first output value to determine whether an entire CAN message including the first CAN message and the second CAN message has an anomaly.

Alternatively, the first neural network model may further include a third hidden layer different from the first hidden layer, and the second neural network model further includes a fourth hidden layer corresponding to the third hidden layer, and the method may further include: after comparing second actual data and the second predictive data obtained based on the second CAN message to determine whether the second CAN message has an anomaly, generating a second concatenation value obtained by concatenating a value of a third hidden state obtained from the third hidden layer and a value of a fourth hidden state obtained from the fourth hidden layer; obtaining a second output value from the second concatenation value by using a pre-trained third neural network model; and comparing the second concatenation value and the second output value to determine whether an entire CAN message including the first CAN message and the second CAN message has an anomaly.

Alternatively, the comparing of the first concatenation value and the first output value to determine whether an entire CAN message including the first CAN message and the second CAN message has the anomaly may include: calculating a second loss value of the pre-trained third neural network model based on a difference between the first concatenation value and the first output value; and comparing the second loss value with a preset second threshold value to determine whether the entire CAN message has an anomaly.

Alternatively, the pre-trained first neural network model may use training data generated based on a CAN message corresponding to the first category, and may be pre-trained such that a difference in values between the output data and the actual data is reduced.

Alternatively, the pre-trained second neural network model may use training data generated based on a CAN message corresponding to the second category, and may be pre-trained such that a difference in values between the output data and the actual data is reduced.

Alternatively, the pre-trained third neural network model may use, as input data, concatenation data obtained by concatenating the values of the plurality of hidden states obtained from the corresponding hidden layers, respectively, of the plurality of neural network models pre-trained for each category of the CAN message through different training data, and may be pre-trained to output output data corresponding to the input data.

Another exemplary embodiment of the present disclosure provides a computer program stored in a computer-readable storage medium, the computer program including instructions to cause a processor of a computing device for detecting a sequence-based intrusion by using a Database CAN (DBC) file to perform following operations, the operations including: obtaining a first Controller Area Network (CAN) message generated from a CAN; determining the first CAN message as a first category among a plurality of categories based on a pre-stored DBC file; obtaining first predictive data from the first CAN message by using a pre-trained first neural network model, the pre-trained first neural network model corresponding to the first category and including a first hidden layer; and comparing first actual data and the first predictive data obtained based on the first CAN message to determine whether the first CAN message has an anomaly.

Still another exemplary embodiment of the present disclosure provides a computing device for detecting a sequence-based intrusion by using a Database CAN (DBC) file, the computing device including: a processor including at least one core; and a memory for storing a computer program executable by the processor; and a network unit, in which the processor may obtain a first Controller Area Network (CAN) message generated from a CAN, determine the first CAN message as a first category among a plurality of categories based on a pre-stored DBC file, obtain first predictive data from the first CAN message by using a pre-trained first neural network model, the pre-trained first neural network model corresponding to the first category and including a first hidden layer, and compare first actual data and the first predictive data obtained based on the first CAN message to determine whether the first CAN message has an anomaly.

Effects of the Invention

The present disclosure may detect a sequence-based intrusion by using a DBC file.

The effects of the present disclosure are not limited to the foregoing effects, and other non-mentioned effects will be clearly understood by those skilled in the art from the description below.

BRIEF DESCRIPTION OF THE DRAWINGS

Various aspects are described with reference to the drawings, and herein, like reference numerals are generally used to designate like constituent elements. In the exemplary embodiment below, for the purpose of description, a plurality of specific and detailed matters is suggested in order to provide general understanding of one or more aspects. However, it is apparent that the aspect(s) may be carried out without the specific and detailed matters.

FIG. 1 is a block diagram of a computing device performing operations to provide a method of detecting a sequence-based intrusion by using a Database CAN (DBC) file according to some exemplary embodiments of the present disclosure.

FIG. 2 is a schematic diagram illustrating a neural network model according to some exemplary embodiments of the disclosure.

FIG. 3 is a block diagram of a processor of the computing device for detecting a sequence-based intrusion by using a DBC file according to some exemplary embodiments of the disclosure.

FIG. 4 is a diagram for illustrating the configuration of a CAN message according to some exemplary embodiments of the present disclosure.

FIG. 5 is a block diagram for illustrating the configuration of a DBC file according to some exemplary embodiments of the disclosure.

FIG. 6 is a block diagram for illustrating a first neural network model according to some exemplary embodiments of the disclosure.

FIG. 7 is a block diagram for illustrating a third neural network model according to some exemplary embodiments of the disclosure.

FIG. 8 is a flowchart for illustrating a method of detecting a sequence-based intrusion by using a DBC file performed by a computing device according to some exemplary embodiments of the present disclosure.

FIG. 9 is a schematic and general diagram illustrating an example of a computing environment in which exemplary embodiments of the present disclosure may be implemented.

DETAILED DESCRIPTION FOR IMPLEMENTING THE INVENTION

Various exemplary embodiments are described with reference to the drawings. In the present specification, various descriptions are presented for understanding the present disclosure. However, it is obvious that the exemplary embodiments may be carried out even without a particular description.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or" not exclusive "or". That is, unless otherwise specified or when it is unclear in context, "X uses A or B" intends to mean one of the natural comprehensive substitutions. That is, in the case where X uses A; X uses B; or, X uses both A and B, "X uses A or B" may apply to either of these cases. Further, a term "and/or" used in the present specification shall be understood to designate and include all of the possible combinations of one or more items among the listed relevant items.

A term "include" and/or "including" shall be understood as meaning that a corresponding characteristic and/or a constituent element exists. Further, it shall be understood that a term "include" and/or "including" means that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

The term "at least one of A and B" should be interpreted to mean "the case including only A", "the case including only B", and "the case where A and B are combined".

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

The description about the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

FIG. 1 is a block diagram of a computing device performing operations to provide a method of detecting an anomaly according to some exemplary embodiments of the present disclosure.

The configuration of a computing device 100 illustrated in FIG. 1 is merely a simplified example. In the exemplary embodiment of the present disclosure, the computing device 100 may include other configurations for performing a computing environment of the computing device 100, and only some of the disclosed configurations may also configure the computing device 100.

The computing device 100 according to some exemplary embodiments of the present disclosure may be a device for determining whether a Controller Area Network (CAN)

message generated in a CAN has an anomaly. The computing device 100 may be a device for determining whether a CAN message has an anomaly by using a neural network model. For example, the computing device 100 may be a device for detecting sequence-based intrusions by using database CAN (DBC) files and neural network models to determine whether a CAN message has an anomaly.

When an anomaly exists in the CAN message, the computing device 100 may recognize a device (for example, a vehicle) using the corresponding CAN that collects the CAN message as being in a dangerous state, and may transmit a danger alarm signal to an external device (for example, a terminal of a vehicle user).

The computing device 100 may include a processor 110, a memory 130, and a network unit 150.

The processor 110 may be formed of one or more cores, and may include a processor, such as a central processing unit (CPU), a general purpose graphics processing unit (GPGPU), and a tensor processing unit (TPU) of the computing device, for performing a data analysis and deep learning. The processor 110 may read a computer program stored in the memory 130 and process data for machine learning according to an exemplary embodiment of the present disclosure. According to the exemplary embodiment of the present disclosure, the processor 110 may perform calculation for training a neural network. The processor 110 may perform a calculation, such as processing of input data for training in Deep Learning (DL), extraction of a feature from input data, an error calculation, and updating of a weight of the neural network by using backpropagation, for training the neural network. At least one of the CPU, GPGPU, and TPU of the processor 110 may process training of a network function. For example, the CPU and the GPGPU may process learning of the network function and data classification by using a network function together. Further, in the exemplary embodiment of the present disclosure, the learning of the network function and the data classification by using a network function may be processed by using the processors of the plurality of computing device together. Further, the computer program executed in the computing device according to the exemplary embodiment of the present disclosure may be a CPU, GPGPU, or TPU executable program.

According to the several exemplary embodiments of the present disclosure, the memory 130 may store a predetermined type of information generated or determined by the processor 110 and a predetermined type of information received by a network unit 150.

According to the several exemplary embodiments of the present disclosure, the memory 130 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The computing device 100 may also be operated in relation to web storage performing a storage function of the memory 130 on the Internet. The description of the foregoing memory is merely illustrative, and the present disclosure is not limited thereto.

The network unit 150 according to some exemplary embodiments of the present disclosure may include any wired or wireless communication network capable of transmitting and receiving any form of data, signals, and the like.

The technologies described in the present specification may be used in other networks, as well as the foregoing networks.

FIG. 2 is a schematic view illustrating a neural network model according to some exemplary embodiments of the present disclosure.

Throughout the present specification, a model, a neural network model, a network function, and a neural network may be used as the same meaning. The neural network may be generally constituted by an aggregate of calculation units which are mutually connected to each other, which may be called "node". The "nodes" may also be called "neurons". The neural network is configured to include one or more nodes. The nodes (alternatively, neurons) constituting the neural networks may be connected to each other by one or more "links".

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

Disclosed is a computer readable medium storing the data structure according to an exemplary embodiment of the present disclosure. The data structure may refer to the organization, management, and storage of data that enables efficient access to and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection relationship between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an effectively designed data structure, a computing device can perform operations while using the resources of the computing device to a minimum. Specifically, the computing device can increase the efficiency of operation, read, insert, delete, compare, exchange, and search through the effectively designed data structure.

The data structure may be divided into a linear data structure and a non-linear data structure according to the type of data structure. The linear data structure may be a structure in which only one data is connected after one data. The linear data structure may include a list, a stack, a queue, and a dequeue. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data listing structure that may access data limitedly and unlike a stack, the queue may be a data structure (FIFO-First in First Out) in which late stored data is output late. The dequeue may be a data structure capable of processing data at both ends of the data structure.

The non-linear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

Throughout the present specification, a computation model, the neural network, a network function, and the neural network may be used as the same meaning. Hereinafter, the computation model, the neural network, the network function, and the neural network will be integrated and described as the neural network. The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for learning the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for learning the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called nodes. The nodes may also be called neurons. The neural network is configured to include one or more nodes.

The data structure may include data input into the neural network. The data structure including the data input into the neural network may be stored in the computer readable medium. The data input to the neural network may include learning data input in a neural network learning process and/or input data input to a neural network in which learning is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include the weight of the neural network (in the present disclosure, the weight and the parameter may be used as the same meaning). In addition, the data structures, including the weight of the neural network, may be stored in the computer readable medium. The neural network may include a plurality of weights. The weight may be variable and the weight is variable by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network learning process and/or a weight in which neural network learning is completed. The weight which varies in the neural network learning process may include a weight at a time when a learning cycle starts and/or a weight that varies during the learning cycle. The weight in which the neural network learning is completed may include a weight in which the learning cycle is completed. Accordingly, the data structure including the weight of the neural network may include a data structure including the weight which varies in the neural network learning process and/or the weight in which neural network learning is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of learning cycle iterations, weight initialization (for example, setting a range of weight values to be subjected to weight initialization), and Hidden Unit number (e.g., the number of hidden layers and the number of nodes in the hidden layer). The data structure is just an example and the present disclosure is not limited thereto.

Referring now to FIG. 3, a configuration of the processor 110 for determining whether a CAN message has an anomaly by using the neural network model previously described with reference to FIGS. 1 and 2 will be described.

FIG. 3 is a block diagram of a processor of the computing device for detecting a sequence-based intrusion by using a DBC file according to some exemplary embodiments of the disclosure.

Referring to FIG. 3, the processor 110 of the computing device 100 may include a message collection unit 200, a preprocessing unit 300, a first neural network model 400, a second neural network model 500, and a third neural network model 600. However, the components described above are not essential to implement the processor 110, and the processor 110 may have more or fewer components than those listed above. Further, the processor 110 may implement the above-described configurations in software.

The message collection unit 200 may obtain at least one CAN message (for example, a first CAN message, and a second CAN message) that occurs in the CAN. For example, the message collection unit 200 may collect at least one CAN message by sniffing traffic generated in a bus of the CAN. However, without limitation, the message collection unit 200 may obtain at least one CAN message through various methods other than those described above.

The CAN may be a communication standard developed to perform communications, including data transmission and reception between systems connected via a bus.

The structure of the CAN may be that nodes (for example, vehicle safety systems, vehicle comfort systems) that configure a particular system (for example, vehicle system, automation equipment system, and medical equipment system) are connected via a bus.

In the CAN, nodes may operate in a multi-master fashion, where each node is connected in parallel as a master and has access to data sent and received from all nodes.

In the CAN, a bus may refer to a shared electrical pathway for nodes to transmit data to each other.

A CAN message is a message that occurs in the CAN and may be a message generated by each of the systems involved in the CAN to transfer data. A CAN message may include an arbitration field and a payload field. The arbitration field may include an arbitration ID. The arbitration ID may consist of 11 or 29 bits and may be an identifier for the CAN message. The payload field may consist of 0 to 64 bits and include the payload, which is the value of the actual data being transferred. The payload may include information to be transmitted from a specific node to another node. The information may be interpreted based on a Database CAN (DBC) file. A Database CAN (DBC) file may be a database file that includes an arbitration ID and information about the meaning and function of each payload field corresponding to the Arbitration ID. Thus, the processor 110 may interpret the payload described in the payload field through the DBC file to obtain the information to be transmitted from a specific node to another node.

Based on the pre-stored DBC file, the preprocessing unit 300 may determine the CAN message to be in one of a plurality of categories. For example, the preprocessing unit 300 may determine the first CAN message to be a first category among the plurality of categories based on the pre-stored DBC file. In another example, the preprocessing unit 300 may determine the second CAN message to be a second category among the plurality of categories based on the pre-stored DBC file.

The plurality of categories may be categories categorized based on functionality. For example, the plurality of categories may include cluster (CLU) related functions, smart cruise control (SCC) related features, airbag control units (ACU) related functions, and the like, which are functions related to the instrument panel. For example, a cluster-related function may include an Electronic Control Unit (ECU) that indicates the speed of the wheels, which is a signal that affects the speed of the vehicle. In another example, functions related to smart cruise control may include ECUs related to steering and lane recognition required for autonomous driving. However, the plurality of categories is not limited thereto, and may include categories related to various functions.

Based on the pre-stored DBC file, the preprocessing unit 300 may categorize the plurality of CAN messages into categories and generate the categorized CAN messages as training data for the plurality of neural network models. For example, the preprocessing unit 300 may generate training data for the first neural network model among the plurality of neural network models by using the CAN message corresponding to a category of the cluster-related function. In another example, the preprocessing unit 300 may generate training data for the second neural network model among the plurality of neural network models by using the CAN message corresponding to a category of the smart cruise control-related function.

The preprocessing unit 300 may adjust a size of the CAN message to correspond to a predetermined time window. For example, when the predetermined time window of the preprocessing unit 300 is 10 seconds, the preprocessing unit 300 may adjust the size of the CAN message to correspond to 10 seconds. The time window may be predetermined from the remaining time, excluding an initial time (for example, 0 to 5 seconds) and an end time (for example, 0 to 5 seconds before the end) to reduce the impact of noise in the total time. However, without limitation, the time window may be predetermined in a variety of ways.

The preprocessing unit 300 may generate training data according to each time in the CAN message. The preprocessing unit 300 may determine data from a CAN message corresponding to a first time in the CAN message as input data, and determine data from a CAN message corresponding to a second time, which is the next time in the first time, as correct answer data, to generate training data where the input data is labeled with the correct answer data. Here, the CAN message may be a CAN message that has been adjusted to correspond to the predetermined time window, or an original CAN message that has not been adjusted.

The first neural network model 400 may be a model capable of processing sequence data, and may be a model that includes hidden layers. For example, the first neural network model 400 may include a Recurrent Neural Network (RNN), a Long Short-Term Memory (LSTM) algorithm, a Gated Recurrent Unit (GRU), or the like. The first neural network model 400 may primarily use the LSTM algorithm. However, without limitation, the first neural network model 400 may include models capable of processing various sequences of data.

The first neural network model 400 may include at least one of a plurality of input layers, at least one of a plurality of hidden layers, and/or at least one of a plurality of output layers.

A plurality of input layers may each refer to an initial layer where input data is directly input.

The plurality of hidden layers may refer to layers configured in response to the plurality of input layers, respectively, and receiving data input from the plurality of input layers, respectively. Each of a plurality of hidden layers may include a value of a hidden state. A hidden state may refer to the internal state of a hidden layer. For example, a hidden state may refer to the internal state of the neurons that configure the hidden layer. The value of the hidden state may refer to a value that represents the internal state of the hidden layer. For example, the value of the hidden state may mean a value that represents the internal state of the hidden layer that reflects information processed at a previous time point by a feedback structure. The value of the hidden state may be a value in the form of a vector.

The plurality of output layers may be configured in response to the plurality of hidden layers, respectively, and may refer to a final layer that receives data input from the plurality of hidden layers, respectively. For example, the first neural network model 400 may output first output data for first input data through the first output layer by inputting the first input data into a first input layer, inputting data generated in the first input layer into a first hidden layer, and inputting data generated in the first hidden layer into a first output layer. In another example, the first neural network model 400 may output second output data for second input data through the second output layer by inputting the second input data into a second input layer, inputting data generated in the second input layer into a second hidden layer, and inputting data generated by the second hidden layer into a second output layer.

The first neural network model 400 may be pre-trained by using training data corresponding to specific categories generated by the preprocessing unit 300. For example, the first neural network model 400 may be pre-trained by using training data generated based on a CAN message corresponding to the first category among the plurality of categories. The first neural network model 400 may be pre-trained such that the difference in values between the output data and the actual data is reduced. For example, the first neural network model 400 may be trained to input input data included in the training data such that the difference in values between the output data and correct answer data labeled on the input data (that is, the actual data) is reduced. The correct answer data may be actual data, that is, the value actually obtained from the CAN message used to generate the training data.

The processor 110 may obtain predictive data from the CAN message by using the pre-trained first neural network model 400.

For example, the processor 110 may obtain first predictive data from a first CAN message by using the pre-trained first neural network model 400. Here, the pre-trained first neural network model 400 may correspond to the first category and include a first hidden layer. Here, the pre-trained first neural network model 400 may be a model pre-trained by using training data corresponding to the first category.

For example, the processor 110 may obtain second predictive data from a second CAN message by using the pre-trained second neural network model 500. Here, the pre-trained second neural network model 500 may include a second hidden layer corresponding to the second category and corresponding to the first hidden layer of the pre-trained first neural network model 400. Here, the pre-trained second neural network model 500 may be a model pre-trained by using training data corresponding to the second category.

The processor 110 may compare the actual data and the predictive data obtained based on the CAN messages to determine whether the CAN message has an anomaly. The predictive data may be data output by inputting data of a CAN message corresponding to the first time of the CAN message into the neural network model (for example, the first neural network model, and the second neural network model) to predict data of a CAN message corresponding to the second time, which is the next time of the first time. The actual data may be the data in the CAN message corresponding to the second time, which is the next time of the first time of the CAN message. For example, the processor 110 may compare first actual data and the first predictive data obtained based on the first CAN message to determine whether the first CAN message has an anomaly. For another example, the processor 110 may compare second actual data and the second predictive data obtained based on the second CAN message to determine whether the second CAN message has an anomaly.

The processor 110 may calculate a loss value for the pre-trained neural network model based on the difference between the actual data and the predictive data. The processor 110 may calculate the loss value by using at least one of a mean absolute error and/or a mean square error. A mean absolute error may be a way to converting a difference between actual data and predictive data to an absolute value and averaging the converted absolute values. A mean square error may be a way to square the difference between actual data and predictive data and averaging the squared difference.

Then, the processor 110 may compare the loss value to a preset threshold value to determine whether the CAN message has an anomaly. The preset threshold value may be a value calculated from repeated experimentation. For example, the processor 110 may compare a first loss value of the first neural network model to a preset first threshold value to determine whether the first CAN message has an anomaly. For another example, the processor 110 may compare a loss value of the second neural network model to a preset threshold value to determine whether the second CAN message has an anomaly.

The second neural network model 500 may have a corresponding configuration to the first neural network model 400. Accordingly, the description of the configuration of the second neural network model 500 may be substituted for the description of the configuration of the foregoing first neural network model 400, and only those portions that differ from the first neural network model 400 will be described below.

The second neural network model 500 may be pre-trained by using different training data from the training data used to train the first neural network model 400. For example, the second neural network model 500 may be pre-trained by using training data generated based on the CAN message corresponding to the second category. The second neural network model 500 may be pre-trained such that the difference in values between the output data and the actual data is reduced.

The processor 110 may generate a plurality of neural network models, each corresponding to a plurality of categories, and train the plurality of neural network models for each category. For example, when the plurality of categories is two, the processor 110 may generate the first neural network model corresponding to the first category and generate the second neural network model corresponding to the second category. The processor 110 may then pre-train the first neural network model by using training data corresponding to the first category, and pre-train the second neural network model by using training data corresponding to the second category.

The processor 110 may generate a first concatenation value obtained by concatenating a value of a first hidden state obtained from a first hidden layer of the first neural network model 400 and a value of a second hidden state obtained from a second hidden layer of the second neural network model 500. Here, the first hidden layer and the second hidden layer may correspond to each other. The processor 110 may obtain a first output value from the first concatenation value by using the pre-trained third neural network model 600.

The third neural network model 600 may be pre-trained by using, as input data, concatenation data obtained by concatenating the values of the plurality of hidden states obtained from the corresponding hidden layers, respectively, of the plurality of neural network models pre-trained for each category of the CAN message through the different training data. The third neural network model 600 may be pre-trained to output output data corresponding to the input data. The concatenation data may include a concatenation value obtained by concatenating the values of the plurality of hidden states. The output data may include an output value that is output in response to the concatenation value obtained by concatenating the values of the plurality of hidden states that are the input data.

The third neural network model 600 may include various neural network models as described above with reference to FIG. 2. For example, the third neural network model 600 may include an autoencoder. The third neural network model 600 may include an encoder unit, a latent vector, and a decoder unit.

The encoder unit may include a plurality of hidden layers, and the concatenation data may be input. The encoder unit may output a latent vector that reduces the dimensionality of the input concatenation data. The latent vector may be a vector whose concatenation data has been reduced by the encoder unit to a predetermined dimension (for example, one dimension or two dimensions). The decoder unit may include a plurality of hidden layers, and a latent vector may be input. The decoder unit may expand the dimensionality of the input latent vector to output an output value of the dimension corresponding to the concatenation data.

The processor 110 may compare the first concatenation value input into the third neural network model 600 and the first output value obtained by using the third neural network model 600 to determine whether the entire CAN message including the first CAN message and the second CAN message has an anomaly.

For example, the processor 110 may calculate a second loss value of the pre-trained third neural network model 600 based on the difference between the first concatenation value and the first output value. The processor 110 may calculate the second loss value by using at least one of a mean absolute error and/or a mean square error. Further, the processor 110 may compare a second loss value of the third neural network model 600 to a preset second threshold value to determine whether the entire CAN message has an anomaly. For example, when the second loss value is greater than the preset second threshold value, the processor 110 may determine that the entire CAN message has an anomaly.

According to some other exemplary embodiments of the present disclosure, the first neural network model 400 may further include a third hidden layer that is different from the first hidden layer. The second neural network model 500 may further include a fourth hidden layer corresponding to the third hidden layer. After comparing the second actual data and the second predictive data obtained based on the second CAN message to determine whether the second CAN message has an anomaly, the processor 110 may generate a second concatenation value obtained by concatenating a value of a third hidden state obtained from the third hidden layer and a value of a fourth hidden state obtained from the fourth hidden layer.

The processor 110 may obtain the second output value from the second concatenation value by using the pre-trained third neural network model 600. The pre-trained third neural network model 600 may receive the second concatenation value and output the second output value. The processor 110 may compare the second concatenation value and the second output value to determine whether the entire CAN message including the first CAN message and the second CAN message has an anomaly.

FIG. 4 is a diagram illustrating a configuration of a CAN message according to some exemplary embodiments of the present disclosure.

Referring to FIG. 4, a CAN message may be a concatenation of the plurality of divided fields. The plurality of fields may include at least one of a Start Of Frame (SOF) field, an arbitration field, a control field, a payload field, a Cyclic Redundancy Check (CRC) field, an Acknowledgment (ACK) field, an End Of Frame (EOF) field, and/or an Intermission (ITM) field. However, the above-described components are not essential for implementing the CAN message, and the CAN message may have more or fewer components than the components listed above.

The SOF field may consist of 1 bit and may indicate the start of a CAN message. Accordingly, the SOF field notifies all nodes connected to the bus that message transmission has started, thereby enabling synchronization of all nodes connected to the bus.

The arbitration field may include an arbitration ID and a Remote Transmission Request (RTR).

The arbitration ID may consist of 11 bits or 29 bits and may be an identifier of a CAN message. The arbitration ID may be a value for determining priority. For example, a CAN message may have higher priority as the arbitration ID value is smaller. However, the CAN message is not limited thereto, and may also have higher priority as the arbitration ID value is greater.

The RTR consists of 1 bit, and when a first CAN message, which is a data frame, and a second CAN message, which is a remote frame, transmitted simultaneously have the same arbitration ID, the RTR may be a value for determining priority. The data frame may refer to a structure including a payload field. The remote frame may mean a structure that does not include a payload field. For example, when the value of the RTR is '0', the corresponding CAN message may be recognized as a data frame. When the value of RTR is '1', the corresponding CAN message may be recognized as a remote frame.

Therefore, it is possible to recognize the first CAN message as a priority by determining the case in which the value of RTR is '0' as the priority between the first CAN message and the second CAN message transmitted at the same time.

The control field may include Identifier Extension (IDE), reserved, and Data Length Code (DLC).

The IDE consists of 1 bit, and may be a value for distinguishing a standard CAN message and an extended CAN message, which are types of corresponding CAN messages. A standard CAN message may be a CAN message having an arbitration ID of 11 bits. The extended CAN message may be a message having an arbitration ID of 29 bits. For example, when the value of IDE is 0, the message may be determined as a standard CAN message. Further, when the value of IDE is 1, the message may be determined as an extended CAN message.

The Reserved consists of two 1 bits (for example, r0 and r1), and may be a value used when an arbitration ID is later extended (for example, 29 bits). For example, the Reserved may be used to extend an arbitration ID to correspond to other communication networks when the Reserved is used in a communication network other than the CAN.

The DLC consists of 4 bits, and may be a value indicating the length of data included in the payload field.

The payload field may consist of 0 to 64 bits and include the payload, which is the value of the transmitted actual data. The payload may include information to be transmitted from a specific node to another node. Here, the information may be interpreted based on the Database CAN (DBC) file. The Database CAN (DBC) file may be a database file including information about the meaning and the function of each payload field. Thus, the processor 110 may interpret the payload described in the payload field through the DBC file to obtain the information to be transmitted from a specific node to another node.

The CRC field may include a Cyclic Redundancy Check sequence (CRC sequence) and a Cyclic Redundancy Check delimiter (CRC delimiter).

The CRC sequence consists of 15 bits, and may be a value calculated based on a specific algorithm at the transmission node. Therefore, a receiving node may determine whether a bit error exists in the CAN message by calculating the value of the CRC sequence based on the specific algorithm described above.

The CRC delimiter consists of 1 bit, and may indicate the end of the CRC field. The ACK field may include an acknowledgment slot (ACK slot) and an acknowledgment delimiter (ACK delimiter).

The ACK slot consists of 1 bit, and may be a value for determining whether normal reception of the CAN message has been completed. For example, when it is determined that the CRC sequence is normal as a result of the check of the CRC sequence, the ACK slot may include a value of '0'. Further, when it is determined that the CRC sequence is abnormal as a result of the check of the CRC sequence, the ACK slot may include a value of '1'.

The ACK delimiter consists of 1 bit, and may indicate the end of an ACK field.

The frame end field consists of 7 bits, and may indicate the end of the frame of the CAN message. For example, the frame end field may consist of '1111111', which is 7 bits.

The intermission field consists of 3 bits and may be a buffer area to facilitate the transmission and reception of CAN messages between nodes.

FIG. 5 is a block diagram for illustrating the configuration of a DBC file according to some embodiments of the disclosure.

Referring to FIG. 5, the Database CAN (DBC) file may be a database file including an arbitration ID and information about the meaning and functionality of each payload field corresponding to the Arbitration ID. The DBC file may include at least one of the following: a signal name, a start bit for the signal, a bit length used, an increment, a range of values, and/or information about the affecting function. For example, the signal name might be a speed of the front left wheel. The start bit of the signal may be zero. The bit length used may be 8. The increment may be 0.0625. The value range may be from 0 to 255. An affecting function may be smart cruise control.

FIG. 6 is a block diagram for illustrating a first neural network model according to some embodiments of the disclosure.

Referring to FIG. 6, the first neural network model 400 may include at least one of a plurality of input layers (for example, a first input layer 411, a third input layer 412, an N-1$^{th}$ input layer 413, and an N$^{th}$ input layer 414, herein, N may be a natural number), at least one of a plurality of hidden layers (for example, a first hidden layer 421, a third hidden layer 422, an N-1$^{th}$ hidden layer 423, and an N$^{th}$ hidden layer 424, herein N may be a natural number), and/or at least one of a plurality of output layers (for example, a first output layer 431, a third output layer 432, an N-1$^{th}$ output layer 433, and an N$^{th}$ output layer 434), herein N may be a natural number).

A plurality of input layers may each refer to an initial layer where input data is directly input. For example, data of a CAN message corresponding to a first time of the CAN message may be input to the first input layer 411. In another example, data of a CAN message corresponding to a second time of the CAN message may be input to the third input layer 412. In another example, data of a CAN message corresponding to an N$^{th}$ time of the CAN message may be input to the N$^{th}$ input layer 414.

The plurality of hidden layers may refer to layers configured in response to the plurality of input layers, respectively, and receiving data input from the plurality of input layers, respectively. For example, the first hidden layer 421 may be configured to correspond to the first input layer 411 and receive data input from the first input layer 411. In another example, the third hidden layer 422 may be configured to correspond to the third input layer 412 and receive data input from the third input layer 412. In another example, the N$^{th}$ hidden layer 424 may be configured to correspond to the N$^{th}$ input layer 414 and receive data input from the N$^{th}$ input layer 414.

The plurality of output layers may be configured in response to the plurality of hidden layers, respectively, and may refer to a final layer that receives data input from the plurality of hidden layers, respectively. For example, the first output layer 431 may correspond to the first hidden layer 421 and may receive data input from the first hidden layer 421 and output first output data. In another example, the third output layer 432 may correspond to the third hidden layer 422 and may receive data input from the third hidden layer 422 and output third output data. In another example, the N$^{th}$ output layer 434 may correspond to the N$^{th}$ hidden layer 424 and may receive data input from the N$^{th}$ hidden layer 424 and output the N$^{th}$ output data.

The second neural network model 500 may include a configuration corresponding to the first neural network model 400. For example, the second neural network model 500 may include a second input layer corresponding to the first input layer 411 of the first neural network model 400, a second hidden layer corresponding to the first hidden layer 421, and a second output layer corresponding to the first output layer 431. In another example, the second neural network model 500 may include a fourth input layer corresponding to the third input layer 412 of the first neural network model 400, a fourth hidden layer corresponding to the third hidden layer 422, and a fourth output layer corresponding to the third output layer 432.

As described above, the second neural network model 500 may include a configuration corresponding to the first neural network model 400. Accordingly, the description of the construction of the second neural network model 500 may be replaced by the description of the configuration of the first neural network model 400 described above.

FIG. 7 is a block diagram illustrating the third neural network model according to some exemplary embodiments of the present disclosure.

Referring to FIG. 7, the third neural network model 600 may include an encoder unit 610, a latent vector 620, and a decoder unit 630.

The encoder unit 610 may include a plurality of hidden layers, and concatenation data may be input. For example, a first concatenation value obtained by concatenating a value of a first hidden state obtained from the first hidden layer 421 of the first neural network model 400 and a value of a second hidden state obtained from the second hidden layer of the second neural network model 500 may be input to the encoder unit 610. In another example, a second concatenation value obtained by concatenating a value of a third hidden state obtained from the third hidden layer 422 of the first neural network model 400 and a value of a fourth hidden state obtained from the fourth hidden layer of the second neural network model 500 may be input to the encoder unit 610. The encoder unit 610 may output a latent vector 620 in which the dimensionality of the input concatenation data (for example, the first concatenation value, and the second concatenation value) is reduced.

The latent vector 620 may be a vector in which the concatenation data has been reduced by the encoder unit 610 to a predetermined dimension (for example, one dimension, or two dimensions).

The decoder unit 630 may include a plurality of hidden layers, and the latent vector 620 may be input. The decoder unit 630 may expand the dimensions of the input latent vector 620 to output output data (for example, the first output value or the second output value) with the dimension corresponding to the concatenation data.

FIG. 8 is a flowchart for illustrating a method of detecting a sequence-based intrusion by using a DBC file performed by a computing device according to some embodiments of the present disclosure.

Referring to FIG. 8, the processor 110 of the computing device 100 may obtain a first CAN message generated in the CAN (S110).

Based on the pre-stored DBC file, the processor 110 may determine the first CAN message as a first category among the plurality of categories (S120).

The processor 110 may obtain first predictive data from the first CAN message by using a pre-trained first neural network model (S130). The first pre-trained first neural network model may correspond to the first category and include a first hidden layer.

The processor 110 may compare first actual data and the first predictive data obtained based on the first CAN message to determine whether the first CAN message has an anomaly (S140). For example, the processor 110 may calculate a first loss value of the pre-trained first neural network model based on a difference between the first actual data and the first predictive data. The processor 110 may compare the first loss value to a preset first threshold value to determine whether the first CAN message has an anomaly.

The processor 110 may obtain a second CAN message generated in the CAN.

The processor 110 may determine the second CAN message as a second category among the plurality of categories based on the pre-stored DBC file.

The processor 110 may obtain second predictive data from the second CAN message by using the pre-trained second neural network model. The pre-trained second neural network model may include a second hidden layer corresponding to the second category and corresponding to the first hidden layer of the first neural network model.

The processor 110 may compare second actual data and the second predictive data obtained based on the second CAN message to determine whether the second CAN message has an anomaly.

The processor 110 may generate a first concatenation value obtained by concatenating a value of a first hidden state obtained from the first hidden layer and a value of a second hidden state obtained from the second hidden layer.

The processor 110 may obtain a first output value from the first concatenation value by using the pre-trained third neural network model.

The processor 110 may compare the first concatenation value and the first output value to determine whether the entire CAN message including the first CAN message and the second CAN message has an anomaly. For example, the processor 110 may calculate a second loss value of the pre-trained third neural network model based on a difference between the first concatenation value and the first output value. The processor 110 may compare the second loss value and a preset second threshold value to determine whether the entire CAN message has an anomaly.

The first neural network model may further include a third hidden layer that is different from the first hidden layer. The second neural network model may further include a fourth hidden layer corresponding to the third hidden layer.

After comparing the second actual data and the second predictive data obtained based on the second CAN message to determine whether the second CAN message has an anomaly, the processor 110 may generate a second concatenation value obtained by concatenating a value of a third hidden state obtained from the third hidden layer and a value of a fourth hidden state obtained from the fourth hidden layer.

The processor 110 may obtain a second output value from the second concatenation value by using the pre-trained third neural network model.

The processor 110 may compare the second concatenation value and the second output value to determine whether the entire CAN message including the first CAN message and the second CAN message has an anomaly.

The pre-trained first neural network model may use training data generated based on the CAN message corresponding to the first category, and may be pre-trained such that the difference in values between the output data and the actual data is reduced.

The pre-trained second neural network model may use training data generated based on the CAN message corresponding to the second category, and may be pre-trained such that the difference in values between the output data and the actual data is reduced.

The pre-trained third neural network model may use, as input data, concatenation data obtained by concatenating the values of the plurality of hidden states obtained from the corresponding hidden layers, respectively, of the plurality of neural network models pre-trained for each category of the CAN message through the different training data, and pre-trained to output output data corresponding to the input data.

The operations illustrated in FIG. 8 are illustrative operations. Accordingly, it will also be apparent to those skilled in the art that some of the operations in FIG. 8 may be omitted or additional operations may be present without departing from the scope of the present disclosure.

In addition, specific details of the configurations 100 to 600 described in FIG. 8 may be replaced with those previously described with reference to FIGS. 1 to 7.

As described above with reference to FIGS. 1 to 8, the computing device 100 for detecting sequence-based intrusion by using a DBC file according to some exemplary embodiments of the present disclosure may categorize CAN messages by function by using the DBC file, and train each of a plurality of neural network models (for example, the first neural network model, and the second neural network model) by using the CAN messages divided by the function. For example, the first neural network model may be trained using a CLU-related CAN message. The second neural network model may be trained by using an SCC-related CAN message. Thus, the computing device 100 according to some exemplary embodiments of the present disclosure may detect intrusions (that is, attacks) by function to perform detection for micro-attacks.

The computing device 100 for detecting sequence-based intrusion by using a DBC file according to some exemplary embodiments of the present disclosure may input a concatenation value obtained by concatenating the value of the hidden state obtained from each of the plurality of neural network models (for example, the first neural network model and the second neural network model) trained by using the CAN message divided by function to the third neural network model to obtain an output value. The computing device 100 may compare the connection value and the output value to determine whether the entire CAN message has anomaly. Thus, the computing device 100 according to some exemplary embodiments of the present disclosure may detect an overall intrusion (that is, attack) to perform detection for macro attacks by using the entire CAN message.

The computing device 100 for detecting sequence-based intrusion by using a DBC file according to some exemplary embodiments of the present disclosure may be operable in real-time with only the neural network model that correspond to the key functioning unit mounted in consideration of the network environment.

The computing device 100 for detecting sequence-based intrusion by using a DBC file according to some exemplary embodiments of the present disclosure organizes and learns for each function based on the DBC file, thereby achieving high accuracy for detecting an abnormal value and a high detection rate by learning the correlation of each function.

According to the computing device 100 for detecting sequence-based intrusion by using a DBC file according to some exemplary embodiments of the present disclosure, because manufacturers have more accurate DBC files than outside researchers and attackers, even if an outside party creates an attack that is not detected after the IDS production, the actual manufacturer's IDS may be more sophisticated and the detection is possible.

The computing device 100 for detecting sequence-based intrusion by using a DBC file according to some exemplary embodiments of the present disclosure organizes and learns for each function based on the DBC file, so that it is possible to check a position targeted by attacks.

FIG. 9 is a normal and schematic view of an exemplary computing environment in which the exemplary embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as software), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various exemplary embodiments presented herein may be implemented as manufactured articles using a method, a device, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

The invention claimed is:

1. A computer-implemented method comprising:
obtaining a first Controller Area Network (CAN) message from a CAN;
determining a first category of the first CAN message among a plurality of categories based on a pre-stored Database CAN (DBC) file mapping message identifiers to functional message categories;
selecting a pre-trained first neural network model corresponding to the first category from among a plurality of pre-trained neural network models;
obtaining first predictive data from the first CAN message using the selected pre-trained first neural network model, the pre-trained first neural network model including a first hidden layer;
comparing the first predictive data with first actual data obtained based on the first CAN message to determine whether the first CAN message is anomalous;
obtaining a second CAN message from the CAN;
determining a second category of the second CAN message among the plurality of categories based on the pre-stored DBC file;
selecting a pre-trained second neural network model corresponding to the second category from among the plurality of pre-trained neural network models;
obtaining second predictive data from the second CAN message using the selected pre-trained second neural network model, the pre-trained second neural network model corresponding to the second category and including a second hidden layer corresponding to the first hidden layer;
comparing the second predictive data with second actual data obtained based on the second CAN message to determine whether the second CAN message is anomalous;
generating a first concatenation value by concatenating a value of a first hidden state obtained from the first hidden layer and a value of a second hidden state obtained from the second hidden layer;
obtaining a first output value from the first concatenation value by using a pre-trained third neural network model; and
comparing the first concatenation value with the first output value to determine whether an entire CAN message including the first CAN message and the second CAN message is anomalous.

2. The method of claim 1, wherein the comparing of the first predictive data with the first actual data comprises:
calculating a first loss value of the pre-trained first neural network model based on a difference between the first actual data and the first predictive data; and
comparing the first loss value with a preset first threshold value to determine whether the first CAN message is anomalous.

3. The method of claim 1, wherein the pre-trained first neural network model further includes a third hidden layer different from the first hidden layer, and the pre-trained second neural network model further includes a fourth hidden layer corresponding to the third hidden layer, and
wherein the method further comprises:
after comparing the second actual data with the second predictive data obtained based on the second CAN message, generating a second concatenation value obtained by concatenating a value of a third hidden state obtained from the third hidden layer and a value of a fourth hidden state obtained from the fourth hidden layer;
obtaining a second output value from the second concatenation value by using the pre-trained third neural network model; and
comparing the second concatenation value with the second output value to determine whether an entire CAN message including the first CAN message and the second CAN message is anomalous.

4. The method of claim 1, wherein the comparing of the first concatenation value with the first output value comprises:
calculating a second loss value of the pre-trained third neural network model based on a difference between the first concatenation value and the first output value; and
comparing the second loss value with a preset second threshold value to determine whether the entire CAN message is anomalous.

5. The method of claim 1, wherein the pre-trained first neural network model uses training data generated based on a CAN message corresponding to the first category, and
wherein the pre-trained first neural network model is pre-trained to reduce a difference in values between an output data and the first actual data.

6. The method of claim 1, wherein the pre-trained second neural network model uses training data generated based on a CAN message corresponding to the second category, and wherein the pre-trained second neural network model is pre-trained to reduce a difference in values between an output data and the second actual data.

7. The method of claim 1, wherein the pre-trained third neural network model uses, as input data, concatenation data obtained by concatenating values of a plurality of hidden states obtained from the corresponding hidden layers, respectively, of the plurality of neural network models pre-trained for each category of the entire CAN message through different training data, and wherein the pre-trained third neural network model is pre-trained to output output data corresponding to the input data.

8. A non-transitory computer-readable storage medium storing instructions that, when executed by one or more processors, cause the one or more processors to perform a method comprising:

obtaining a first Controller Area Network (CAN) message from a CAN;

determining a first category of the first CAN message among a plurality of categories based on a pre-stored Database CAN (DBC) file mapping message identifiers to functional message categories;

selecting a pre-trained first neural network model corresponding to the first category from among a plurality of pre-trained neural network models;

obtaining first predictive data from the first CAN message using the selected pre-trained first neural network model, the pre-trained first neural network model including a first hidden layer;

comparing the first predictive data with first actual data obtained based on the first CAN message to determine whether the first CAN message is anomalous;

obtaining a second CAN message from the CAN;

determining a second category of the second CAN message among the plurality of categories based on the pre-stored DBC file;

selecting a pre-trained second neural network model corresponding to the second category from among the plurality of pre-trained neural network models;

obtaining second predictive data from the second CAN message using the selected pre-trained second neural network model, the pre-trained second neural network model corresponding to the second category and including a second hidden layer corresponding to the first hidden layer;

comparing the second predictive data with second actual data obtained based on the second CAN message to determine whether the second CAN message is anomalous;

generating a first concatenation value by concatenating a value of a first hidden state obtained from the first hidden layer and a value of a second hidden state obtained from the second hidden layer;

obtaining a first output value from the first concatenation value by using a pre-trained third neural network model; and comparing the first concatenation value with the first output value to determine whether an entire CAN message including the first CAN message and the second CAN message is anomalous.

9. A device comprising at least one processor and a memory coupled to the at least one processor, the memory storing instructions which, when executed by the at least one processor, cause the device to:

obtain a first Controller Area Network (CAN) message from a CAN;

determine a first category of the first CAN message among a plurality of categories, based on a pre-stored Database CAN (DBC) file mapping message identifiers to functional message categories;

select a pre-trained first neural network model corresponding to the first category from among a plurality of pre-trained neural network models, obtain first predictive data from the first CAN message using a pre-trained first neural network model, the pre-trained first neural network model including a first hidden layer;

compare the first predictive data with first actual data obtained based on the first CAN message to determine whether the first CAN message is anomalous;

obtain a second CAN message from the CAN;

determine a second category of the second CAN message among the plurality of categories based on the pre-stored DBC file;

select a pre-trained second neural network model corresponding to the second category from among the plurality of pre-trained neural network models;

obtain second predictive data from the second CAN message using the selected pre-trained second neural network model, the pre-trained second neural network model corresponding to the second category and including a second hidden layer corresponding to the first hidden layer;

compare the second predictive data with second actual data obtained based on the second CAN message to determine whether the second CAN message is anomalous;

generate a first concatenation value by concatenating a value of a first hidden state obtained from the first hidden layer and a value of a second hidden state obtained from the second hidden layer;

obtain a first output value from the first concatenation value by using a pre-trained third neural network model; and compare the first concatenation value with the first output value to determine whether an entire CAN message including the first CAN message and the second CAN message is anomalous.

* * * * *